May 11, 1943.　　　　F. C. DOBLE　　　　2,318,601
ELECTRICAL MEANS FOR INDICATING TEMPERATURE CONDITIONS
Filed June 22, 1939

Inventor
Frank C. Doble
by Wright, Brown, Quinby & May
Attys.

Patented May 11, 1943

2,318,601

UNITED STATES PATENT OFFICE 2,318,601

ELECTRICAL MEANS FOR INDICATING TEMPERATURE CONDITIONS

Frank C. Doble, Cambridge, Mass., assignor to Doble Engineering Company, Medford, Mass., a corporation of Massachusetts Application June 22, 1939, Serial No. 280,549

15 Claims. (Cl. 73—342)

The present invention is concerned with means or apparatus for investigating and indicating temperature conditions existing in localities more or less distant from the places where such investigations and indications are made. One illustrative example of the need and use for such an apparatus is that of ascertaining the temperature conditions affecting the dielectrics which are fabricated with electrical conductors into cables of various forms for industrial use to confine the courses of electrical currents to prescribed conducting paths. In most installations where insulating material is so used, it is important that the highest temperature of any heated locality or area through which such conductors pass be made known, in order that determination may be made of the maximum load which the conductor can carry without injury to the insulation due to overheating. It is also important that indication be made at once upon the occurrence of a temperature so high as to endanger the insulation when a maximum capacity load is carried by the insulated conductor; and that warning be given of faulty insulation, causing high losses, and of the failure of insulation, so that the location of the faulty insulation may be quickly determined.

This is particularly necessary with respect to lead encased power cable installed in ducts under ground, where unknown and uncontrollable temperature conditions may exist. It is not possible in the present state of the art either to measure or to control the temperatures surrounding conductors so installed, through any considerable distance. A hitherto unsatisfied need exists for an apparatus which will indicate when the temperature of any part of such a cable is above or below some predetermined value.

The invention comprises a means for indicating temperatures in conditions such as those above mentioned, either quantitatively, as the temperature existing at a certain point or in a selected area or line; or qualitatively, as that the temperature is above or below some degree previously established as a limiting quantity or danger point.

The foregoing are illustrative examples, but not an exhaustive statement, of the object and general nature of the invention.

The principles of the invention are founded upon my discovery that the conductivity of hygroscopic insulation containing a constant quantity of moisture in vapor condition, between two electrical conductors at different direct current potentials is a function of the temperature of the insulation. For example, I discovered that when two No. 23 copper wires, each surrounded by cotton insulation throughout their length in common, were twisted together so that their coverings were in contact with one another over a a substantial area, and a unidirectional electrical potential difference was created between the wires, the cotton when dry (i. e., containing less moisture than the quantity hereinafter stated), had an insulation value of several hundred megohms throughout the range from 20° C. to 100° C.; but when the fibers of the cotton insulation contained moisture equivalent to the pick up from air at 30° relative humidity and 20° C. temperature, the insulating value was in the order of hundreds of megohms at 20° C. and dropped with increase of temperature to about 50 megohms at 100° C. When any section of such conductors was subjected to temperatures higher than 20° C., an increase in the direct current conductivity was established at the heated point, and the conductivity at such point increased in approximately direct proportion to the rise in temperature.

I found further than when in addition to such hydroscopic insulation having a moisture content in the order of that above indicated, a further insulating medium, such as oil, wax, or a similar medium was present between the conductors, then the ratio of increase of conductivity to rise of temperature varied in accordance with the characteristics of the added medium. With, for example, paraffin wax having a melting point of 60° C. as the added insulating medium, the direct current conductivity below the melting point is so small that it is beyond the range of ordinary sensitive indicating apparatus. Above the melting point the conductivity increases to a degree which is easily readable on such apparatus and may be employed for actuating indicators of various kinds. The added insulating medium of nonvolatile character also has the effect of sealing the moisture in the hygroscopic insulation permanently, or at least so effectively that the moisture content does not change appreciably during long periods of time.

Utilizing the principles of the discoveries above described, I have devised apparatus which may be employed in a multitude of situations for taking measurements of temperatures in inaccessible places, for detecting the occurrence of dangerous temperatures, for indicating temperature changes in various ways, for giving such indications or measurements at observation points remote from the localities where the temperatures occur, and for performing many other useful services.

In the drawing furnished herewith to illustrate the invention:

Figure 1:
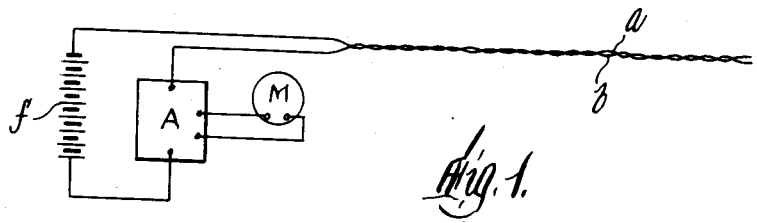
Fig. 1 is a diagrammatic view of one form of indicating apparatus containing the invention.

A simple form of complete apparatus embodying the invention is shown in Fig. 1. The portion which may be called for the purpose of this description the detector element consists of two covered wires $a$ and $b$ (shown on a larger scale in Figs. 3 and 4). These wires are surrounded by a covering $c$ of cotton, or equivalent material capable of absorbing moisture. The cotton may be in the form of thread or yarn wound around the wire, as employed with magnet wire, or it may be otherwise applied. Indeed this phase of the invention is not limited to cotton. Other fibrous insulation may be employed, or indeed materials which are not necessarily fibrous but which provide spaces, channels or paths in which moisture may be contained in such a way as to produce effects substantially such as those herein described.

Figure 3:
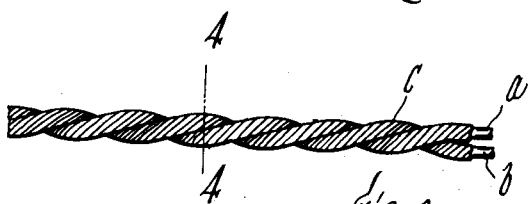
Fig. 3 is a fragmentary side view of a pair of twisted conductors covered with fibrous insulation and constituting one embodiment of the heat-responsive element of the measuring apparatus.
Figure 4:
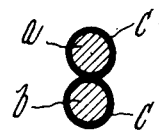
Fig. 4 is a cross section on line 4—4 of Fig. 3 and drawn on an enlarged scale.

These wires are maintained with their coverings in close contact with one another throughout at least so much of their length as is to be exposed for temperature detection. Conveniently this close contact is effected by twisting the wires together, as indicated in Fig. 3. But this is not an essential detail. An equivalent combination of conductors consists of a wire $d$ encased insulation $c$ of the character above defined and contained within a metal outer shell or tube $e$ of such dimensions that the covering $c$ is held in close contact with the wire and with the inner surface of the tube. The tube is adapted to serve as one conductor and the wire as the other conductor of the detecting element, with the interposed insulation containing moisture and in contact with both conductors constituting the medium of which the resistance varies with variations of temperature. The tube also serves to confine oil, wax or the like when such is provided as the added medium previously referred to; and, when the tube is sufficiently sealed at the ends, it prevents escape of such fluid or fusible medium. In the absence of such added medium, with its moisture sealing effect, the tube itself confines the moisture content of the insulation. The twisted wires without an outer sheath may likewise be impregnated with such added medium; but the combination including the impervious metallic outer sheath or tube has obvious advantages in respect to confining the added medium when of a fluid or liquefiable character.

Various other modifications of the detector element may be provided within the scope of the protection which I claim, including two or more wires with similar insulation in a fluid-confining sheath of either electrically conductive or non-conductive material. But I believe that the principles are sufficiently explained by reference to the foregoing illustrations.

A detector element having the characteristics herein explained is combined with a source of electric potential and with means for indicating or measuring voltage, current, or losses through the insulation, for furnishing useful information. A source of direct potential, as the battery $f$ shown in Fig. 1, is connected to one of the conductors $a$ or $b$ (it is unimportant which one), or one of the conductors $d$ or $e$. The other conductor is connected with an indicator responsive to electric current; and such indicator is connected in series with the battery. A suitable indicator is diagrammatically represented in Fig. 1 as the well known vacuum tube voltmeter consisting of a direct current amplifier A and a current meter M. The amplifier is of known character, including a vacuum tube, voltage sources and an adjustable resistance. Its utility is to amplify the feeble currents passing through the insulation of the detector so that they will operate a meter, or other device, such as a relay responsive to the current flow.

Where a definite quantitative determination of the current or losses between the conductors is not desired, the meter may be replaced by a relay operating an electric light or other indicating element.

In operation, the ends of the conductors remote from the voltage source and instrument are separated from one another, leaving the moist insulation as the only locus of current paths between them. Hence when the conductors are subjected to a difference of potential, an indication is given by the instrument upon heating of the detector element at some point to a degree sufficient to permit flow of enough current through the insulation under the applied voltage to operate the instrument. A voltage source is provided having suitable voltage for the test or class of tests to be performed. The specific voltages used may vary considerably in different circumstances of testing, and may be in the order of from 20 to 150 volts. In the circumstances here described, such voltages produce currents through the moist insulation of a few micro-amperes at most.

Figure 2:
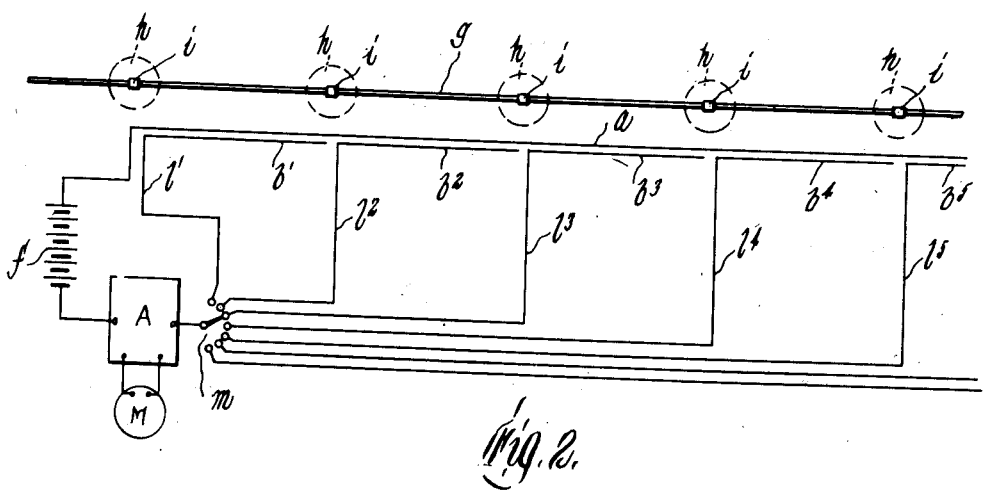
Fig. 2 is a diagram illustrating the manner of use of such apparatus for indicating temperatures and detecting temperature changes affecting a power circuit conductor contained in an underground duct or conduit.
Figure 5:
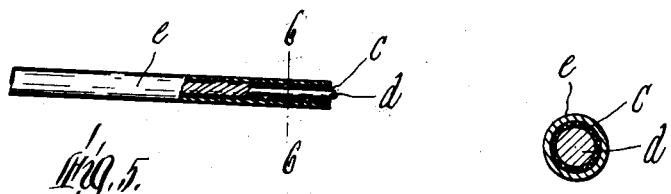
Fig. 5 is a fragmentary side view partly in section of another form of heat-responsive detector element usable in place of the element shown in Fig. 3.
Figure 6:
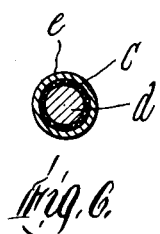
Fig. 6 is an enlarged sectional view taken on line 6—6 of Fig. 5.

This apparatus may be used in many ways for measuring temperatures or detecting the presence of heat dangerous to electrical equipment. Fig. 2 illustrates its use in connection with a power cable $g$ contained in an underground duct. Manholes indicated at $h$ open into the duct at prescribed intervals, for instance, every 300 feet, and there joints $i$ are made in the power cable. A detector is laid in the duct alongside the cable, or may be incorporated as a part of the cable. One of the conductors of the detector, as that designated $a$ in Fig. 2, may extend continuously throughout the entire length of the cable or any part of it longer than the distance between two manholes, while the other conductor is divided into sections $b^1$, $b^2$, $b^3$, etc., each disconnected from the other, but having the same relation to the conductor $a$ as that shown in Fig. 3, or that shown in Fig. 5. Where the detector having a conducting outer tube as e is used, the tube may be cut into sections insulated from each other and the wire d may be the continuous conductor. But the converse may be employed, with taps led from disconnected parts of the wire d through a continuous outer tube, insulated from the latter.

Conductors $l^1$, $l^2$, $l^3$, etc. lead from the several sections of the discontinuous conductor to the contacts of a multiple contact switch m. The battery f and indicator A, M are connected in series between one conductor and the switch, either in the order shown or in reverse order. Hence by moving the switch to complete the circuit with any one of the discontinuous conductors, the occurrence of a dangerous temperature in portions of the duct between any two manholes may be detected. Instead of the arrangement shown, each of the lead conductors $l^1$, $l^2$, $l^3$, etc., may be in continuous parallel connection with the battery through a separate measuring instrument, whereby temperature conditions in all the areas will be shown at the same time and changes manifested simultaneously.

In other ways, but all embodying the same principle, the invention may be applied to indicating temperatures in connection with many other electrical installations, for giving an alarm of fire, and in other situations as well.

Figure 7:
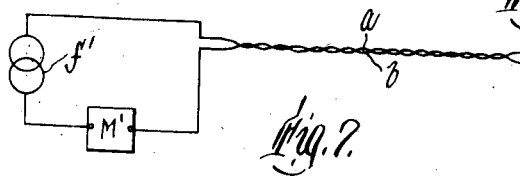
Fig. 7 is a diagram similar to Fig. 1 but showing another embodiment of the invention.

Apparatus embodying the principles described but operating under impressed alternating potential is likewise within the scope of the invention. In using alternating potential precautions are taken to allow for the charging current, which will be dependent on the electrical capacitance between the conductors. The component of current in phase with the impressed voltage in the system, which varies with the temperature of the insulation between the conductors of the detector element, is measured by well known methods; as with the use of a wattmeter, a bridge, electronic devices, or any means which balances the out-of-phase component. Fig. 7 illustrates the last-described embodiment, showing conventionally at f' a source of alternating voltage and at M' a suitable measuring means of the character described, in series electrical connection with the conductors of the detector element.

The principles of the invention for which I desire to obtain protection include all equivalents of the illustrative embodiments hereinbefore described. For example, they are not limited to water vapor as the substance contained in insulation making the conductivity of the insulation, of losses through the insulation, variable in response to temperature changes. Neither are they limited to wax or oil as the added insulating medium of relatively non volatile character, nor to fibrous insulation as the covering of either or both conductors. Other liquids and vapors which, when present in insulation in controlled and limited amounts, such that excessive flow of current will not occur, cause the resistance of such insulation to vary measurably with changes of temperature, are within the scope of the broadest of the appended claims and are intended to be protected thereby. The term "moisture" where used in a generic way in the claims, is to be construed as including such equivalent media. Where used in contexts signifying that the moisture is water, the terms "moisture," "moist," and the like signify the condition or content of moisture in the insulation such as results from the absorption or adsorption of water vapor from air of moderate humidity (say from 20% to 50% relative humidity) at the same temperature as the insulation.

The possible uses of the invention are so many that I have not attempted to state or even to suggest them all. What I have sought to do by this specification is to explain the basic principle of the invention and the general nature of its utility. I include within the scope of the protection herein sought all variations from the specific disclosure containing such general principles and all the uses to which apparatus containing such principles may be put.

What I claim and desire to secure by Letters Patent is:

1. A detector for cooperation with a source of electric potential and a current responsive indicating instrument electrically connected with said source to indicate temperature conditions, comprising electrically separated conductors, one of which is adapted to be connected to said source and the other to the indicating instrument, and moisture-absorbent insulating material containing moisture sufficient to cause its conductivity to vary with changes of its temperature and a fluid or readily fusible dielectric, said detector further comprising a sheath enveloping said insulation and dielectric and by which the moisture content of the insulation and the fluid dielectric are confined.

2. An instrument for detecting the presence of heat comprising two long and continuous conductors, one of which is tubular and encloses the other, insulating material surrounding the inner conductor and contained within the outer conductor throughout the length in common of the conductor, said insulating material having different insulating properties under different temperature conditions and being adapted to conduct current in greater measure than elsewhere at any point in its length which is heated to a higher temperature than the rest of the material, a source of electric potential connected to one of said conductors and an electrical indicating instrument connected to the other of said conductors and to the opposite terminal of said source from that to which the first mentioned conductor is connected, said conductors being otherwise connected electrically with one another through said insulation only.

3. An elongated instrument for detecting the presence of heat at any point or limited section of its length, comprising two conductors, one of which is tubular and encloses the other, insulating material surrounding the inner conductor and contained within the outer conductor, said insulating material comprising moisture-absorbent matter containing moisture in such proportion that its electrical conductivity increases with rise of temperature, and containing also a readily fusible dielectric, all contained and confined within the tubular conductor.

4. A detector element for use in connection with a source of electric potential and an electrical indicator consisting of an electrical conductor, an envelope of insulating material containing moisture in vapor condition surrounding said conductor, the content of moisture being such that the conductivity of the envelope increases with rise of temperature, and an external conductor enveloping said insulation and electrically separated by said insulating material from the inner conductor.

5. A detector instrument for indicating temperature conditions and changes, comprising two continuous elongated electrical conductors side by side, and insulation between and in physical contact with said conductors substantially throughout their side-by-side extent and containing a limited quantity of another substance which alters the character of the insulation in such manner that its insulating value varies with changes of temperature affecting it, the quantity of such substance being insufficient to cause excessive flow of current and enabling current to flow at any locally heated spot in the length of said insulation; said conductors being otherwise electrically disconnected from each other except at some point or points where they are in circuit connection through a source of electrical potential and means capable of indicating or measuring current or energy loss through the insulation.

6. A detector instrument as set forth in claim 5, in which the substance therein defined is a vapor; and a non-conductive, less volatile, substance in which said vapor is entrapped is also contained within the insulation.

7. A detector instrument for indicating temperature conditions comprising two electrical conductors side by side and an insulating medium between and in physical contact with said conductors containing moisture sufficient to cause measurable changes in its insulating value with changes of temperature affecting the insulation, but insufficient to cause excessive flow of current; said conductors being in circuit electrically with one another at one terminal of each through a source of potential and a voltage, current, or loss, indicator in series connection, the other terminals of the conductors being electrically disconnected from each other.

8. A detector as set forth in claim 7, in which the insulation is absorbent and its moisture content is water vapor within the range of pick up from moderately humid air.

9. A detector as set forth in claim 7, in which the insulating medium contains an added substance less volatile than water whereby the moisture content of the insulation is held constant under different moisture conditions of the ambient atmosphere.

10. A temperature indicating instrument comprising two conductors in proximity to each other, insulation containing water in vapor condition and in quantity substantially equivalent to the pick up of water by the insulation from moderately humid air, said insulation being in physical contact with both conductors, means for maintaining at constant value the moisture content of said insulation, an indicator responsive to electric current connected to one terminal of one of said conductors, and a source of electrical potential connected between said indicator and one terminal of the other conductor, the conductors being otherwise electrically separated from each other except through the conductive paths established through the insulation by the moisture content thereof, the conductivity of such paths being variable in accordance with changes of temperature affecting the insulation.

11. An apparatus for detecting temperature conditions affecting electric cables and the like contained in a duct, comprising an elongated conductor extending through the duct and electrically insulated from the conductors of such cable or the like, a number of conductors insulated from the first conductor and from each other located close to the first conductor in series beside different portions of the length thereof, the conductors of said series being insulated from the first named conductor by insulation containing an added medium of suitable character and in suitable quantity to cause measurable changes in the insulating value of such insulation with changes of temperature affecting the insulation, a switch having isolated contacts in electrical connection exclusively with the several conductors of the said series of conductors, and a source of electrical potential and an indicator responsive to electric current connected in series with said switch and one of the terminals of the first named conductor.

12. An instrument for detecting the presence of heat, comprising two conductors, one of which is tubular and surrounds the other, moisture absorbent insulation surrounding the inner conductor and contained within the outer conductor, and a quantity of water vapor contained in said insulation and being sealed and retained within the tubular conductor, said water vapor being in the order of the content of water which would be absorbed by the insulation on prolonged exposure to atmospheric air containing from 20% to 50% relative humidity at ordinary atmospheric temperatures.

13. A detector element for use in connection with a source of electrical potential and an electrical indicator consisting of elongated electrically separated conductors and moisture-absorbent insulating material between and in physical contact with both said conductors throughout substantially their entire common length, said insulating material containing moisture in such measure that its electrical conductivity increases sufficiently to cause a change of indication by such an indicator when any point or portion less than its entire length is raised in temperature, and when a difference of electrical potential is applied between the conductors.

14. A temperature detector for cooperative combination with a source of electric potential and a current-responsive indicating instrument, comprising electrically separated elongated conductors, one of which is provided for connection with said source and the other with said indicating instrument, and moisture-absorbent insulating material, containing absorbed moisture in sufficient amount to cause measurable current flow from one conductor to the other when subjected to temperatures higher than 20° C. at any point or section of less than its entire length, and when a difference of potential is applied between the conductors, said material being interposed between and in contact with said conductors.

15. A temperature detector for cooperative combination with a source of electric potential and a current-responsive indicating instrument, comprising electrically separated elongated conductors, one of which is provided for connection with said source and the other with said indicating instrument, and moisture-absorbent insulating material, containing absorbed moisture in sufficient amount to cause measurable current flow from one conductor to the other when subjected to temperatures higher than 20° C. at any point or section of less length than its entire length, and when a difference of potential is applied between the conductors, said material being interposed between and in contact with said conductors, and one of the conductors comprising an impervious sheath enclosing said insulation and by which the moisture content thereof is confined.

FRANK C. DOBLE.